United States Patent
Cho et al.

(10) Patent No.: US 12,230,443 B2
(45) Date of Patent: *Feb. 18, 2025

(54) MULTILAYER ELECTRONIC COMPONENT

(71) Applicant: SAMSUNG ELECTRO-MECHANICS CO., LTD., Suwon-si (KR)

(72) Inventors: Min Jung Cho, Suwon-si (KR); Byung Kun Kim, Suwon-si (KR); Yu Hong Oh, Suwon-si (KR); Chang Hak Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,365

(22) Filed: Jun. 15, 2023

(65) Prior Publication Data

US 2023/0326673 A1 Oct. 12, 2023

Related U.S. Application Data

(63) Continuation of application No. 17/379,465, filed on Jul. 19, 2021, now Pat. No. 11,715,595.

(30) Foreign Application Priority Data

Nov. 19, 2020 (KR) ........................ 10-2020-0155481

(51) Int. Cl.
*H01G 4/00* (2006.01)
*H01G 4/008* (2006.01)
(Continued)

(52) U.S. Cl.
CPC ............. *H01G 4/008* (2013.01); *H01G 4/248* (2013.01); *H01G 4/30* (2013.01)

(58) Field of Classification Search
None
See application file for complete search history.

(56) References Cited

U.S. PATENT DOCUMENTS 7,509,717 B2 * 3/2009 Fukui ...................... H01G 4/30
                                                                                        29/25.42
9,390,855 B2 * 7/2016 Saito .................... H01G 4/0085
(Continued)

FOREIGN PATENT DOCUMENTS

CN        102903519 B      12/2016
JP         2013-98312 A      5/2013
(Continued)

OTHER PUBLICATIONS

Kum-Jin Park, et al., "The Doping Effects of Intermediate Rare-earth Ions (Dy, Y and Ho) on BaTiO3 Ceramics" Journal of the Korean Ceramic Society, vol. 46, No. 2, pp. 181~188 (2009) including its English Abstract.
(Continued)

*Primary Examiner* — Dion R. Ferguson
(74) *Attorney, Agent, or Firm* — MORGAN, LEWIS & BOCKIUS LLP (57) ABSTRACT

A multilayer electronic component includes a body including dielectric layers and internal electrodes alternately disposed with the dielectric layers and external electrodes disposed on the body and connected to the internal electrodes. The one of the internal electrodes includes Ni, Ba, Ti, O, and Tb, and a content of Tb relative to a sum of contents of Ni, Ba, Ti, O, and Tb is 0.45 to 3.0 wt %.

6 Claims, 5 Drawing Sheets (51) Int. Cl.
*H01G 4/248* (2006.01)
*H01G 4/30* (2006.01)

(56) References Cited

U.S. PATENT DOCUMENTS

| | | | |
|---|---|---|---|
| 11,715,595 B2* | 8/2023 | Cho .................. | H01G 4/30 361/301.4 |
| 2003/0142463 A1 | 7/2003 | Nakamura et al. | |
| 2006/0171099 A1 | 8/2006 | Barber et al. | |
| 2009/0122462 A1* | 5/2009 | Suzuki ............... | H01G 4/1209 156/89.12 |
| 2013/0027839 A1* | 1/2013 | Kim .................. | H01G 4/30 361/321.2 |
| 2013/0094118 A1* | 4/2013 | Kim .................. | H01G 4/30 361/301.4 |
| 2014/0048750 A1* | 2/2014 | Kim .................. | H01B 1/22 977/932 |
| 2014/0063685 A1* | 3/2014 | Lee .................. | H01G 4/008 361/301.4 |
| 2014/0355177 A1 | 12/2014 | Lee et al. | |
| 2015/0077897 A1* | 3/2015 | Wada ................ | H01G 4/30 361/274.1 |
| 2015/0187497 A1* | 7/2015 | Saito ................ | H01G 4/1227 361/301.4 |
| 2018/0090273 A1* | 3/2018 | Hwang .............. | H01G 4/2325 |
| 2019/0135701 A1* | 5/2019 | Yun .................. | H01G 4/1236 |
| 2020/0013553 A1* | 1/2020 | Cha .................. | H01G 4/012 |
| 2020/0058444 A1* | 2/2020 | Cha .................. | H01G 4/12 |
| 2020/0118751 A1* | 4/2020 | Choi ................ | H01G 4/008 |
| 2020/0258684 A1* | 8/2020 | Yun .................. | H01G 4/228 |
| 2021/0027943 A1* | 1/2021 | Cha .................. | H01G 4/1218 |
| 2021/0035740 A1* | 2/2021 | Kim .................. | H01G 4/30 |
| 2021/0035741 A1* | 2/2021 | Cho .................. | H01G 4/1218 |
| 2021/0398748 A1* | 12/2021 | Cha .................. | H01G 4/1218 |
| 2022/0157522 A1* | 5/2022 | Cho .................. | H01G 11/48 |

FOREIGN PATENT DOCUMENTS

| | | |
|---|---|---|
| JP | 2019-87568 A | 6/2019 |
| KR | 10-2003-0029499 A | 4/2003 |
| KR | 10-2014-0139832 A | 12/2014 |
| KR | 10-2019-0019117 A | 2/2019 |
| WO | 2013/175945 A1 | 11/2016 |

OTHER PUBLICATIONS

Yukio Sakabe, et al., "Effects of Rare-earth Oxides on the Reliability of X7R Dielectrics," Jpn. J. Appl. Phys., vol. 41 5668-5673 (2002).
Notice of Allowance issued in corresponding U.S. Appl. No. 17/379,465 dated Mar. 15, 2023.
Final Office Action issued in corresponding U.S. Appl. No. 17/379,465 dated Dec. 5, 2022.
Office Action issued in corresponding U.S. Appl. No. 17/379,465 dated Aug. 26, 2022.
Office Action issued in corresponding Korean Patent Application No. 10-2020-0155481 on Sep. 26, 2024, with English translation.

* cited by examiner

MULTILAYER ELECTRONIC COMPONENT

CROSS-REFERENCE TO RELATED APPLICATION

This application is the continuation application of U.S. patent application Ser. No. 17/379,465 filed on Jul. 19, 2021, which claims benefit of priority to Korean Patent Application No. 10-2020-0155481 filed on Nov. 19, 2020, in the Korean Intellectual Property Office, the disclosures of which are incorporated herein by reference in their entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of various types of electronic products such as display devices including liquid crystal displays (LCDs) and plasma display panels (PDPs), computers, smartphones, cell phones, and the like, to allow electricity to be charged therein and discharged therefrom.

The MLCC, advantageously compact, ensures high capacitance, facilitates mounting, and thus may be used as a component of various types of electronic devices. Recently, as components of electronic devices have been miniaturized, demand for smaller multilayer ceramic capacitors having higher capacitance has increased.

To reduce a size and to increase capacitance of multilayer ceramic capacitors, a technology for forming thinner internal electrodes and dielectric layers is required.

However, as the internal electrodes and the dielectric layers are reduced in thickness, internal electrode connectivity may be deteriorated and an internal thickness deviation may increase, thereby reducing reliability.

SUMMARY

An aspect of the present disclosure may provide a multilayer electronic component including internal electrodes having improved reliability.

An aspect of the present disclosure may also provide a multilayer electronic component including internal electrodes having improved electrode connectivity.

An aspect of the present disclosure may also provide a multilayer electronic component including internal electrodes having a reduced thickness deviation.

Another aspect of the present disclosure may also provide a compact, high-capacitance multilayer electronic component having high reliability.

According to an aspect of the present disclosure, a multilayer electronic component may include: a body including dielectric layers and internal electrodes alternately disposed with the dielectric layers; and external electrodes disposed on the body and connected to the internal electrodes. One of the internal electrodes includes Ni, Ba, Ti, O, and Tb, and a content of Tb relative to a sum of contents of Ni, Ba, Ti, O, and Tb is 0.45 to 3.0 wt %.

According to an aspect of the present disclosure, a multilayer electronic component may include: a body including dielectric layers and internal electrodes alternately disposed with the dielectric layers; and external electrodes disposed on the body and connected to the internal electrodes. One of the internal electrodes and one of the dielectric layers in contact with the one of the internal electrodes may include Tb.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In the drawings, an X direction may be defined as a second direction, an L direction, or a length direction, a Y direction may be defined as a third direction, a W direction, or a width direction, and a Z direction may be defined as a first direction, a stacking direction, a T direction, or a thickness direction.

Methods and/or tools appreciated by one of ordinary skill in the art, even if not described in the present disclosure, may also be used in measuring a parameter described in the present disclosure.

Multilayer Electronic Component

Figure 1:
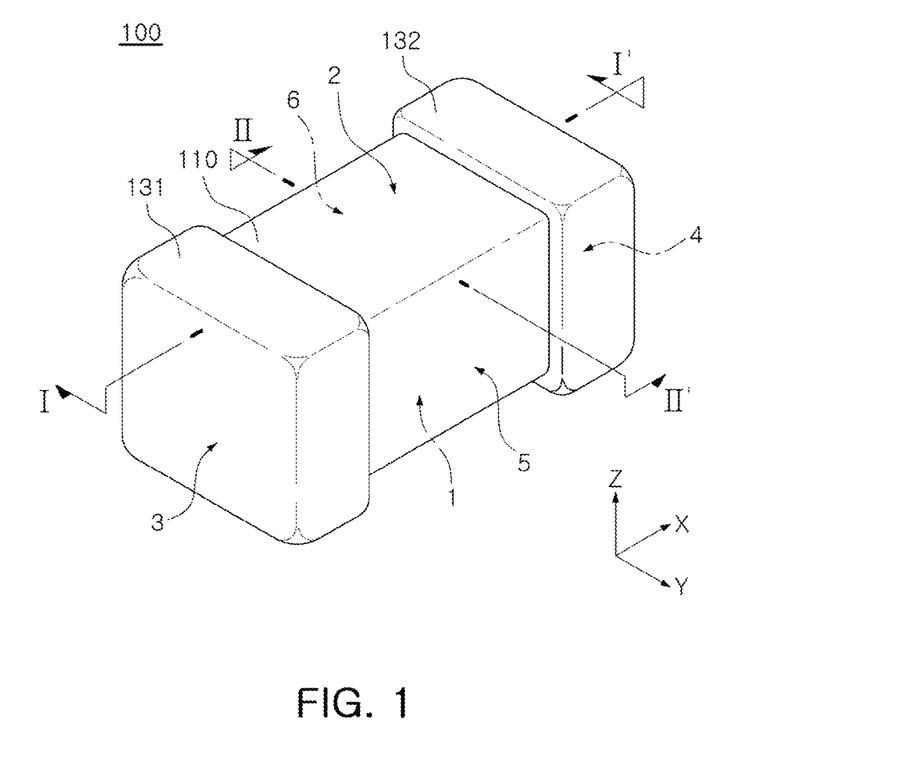
FIG. 1 is a schematic perspective view of a multilayer electronic component according to an exemplary embodiment in the present disclosure.

FIG. 1 is a schematic perspective view of a multilayer electronic component according to an exemplary embodiment in the present disclosure.

Figure 2:
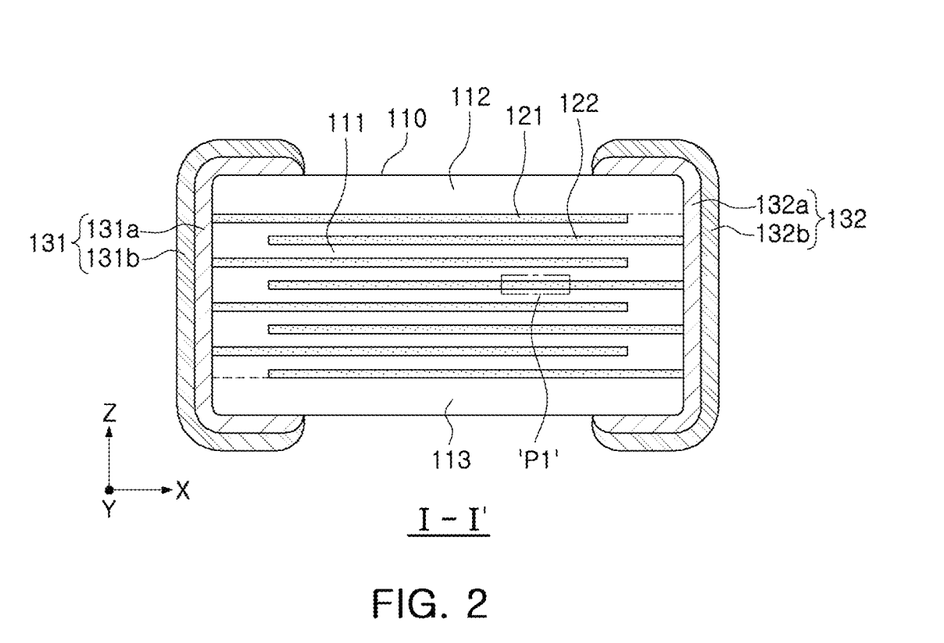
FIG. 2 is a cross-sectional view taken along line I-I' of FIG. 1.

FIG. 2 is a cross-sectional view taken along line I-I' of FIG. 1.

Figure 3:
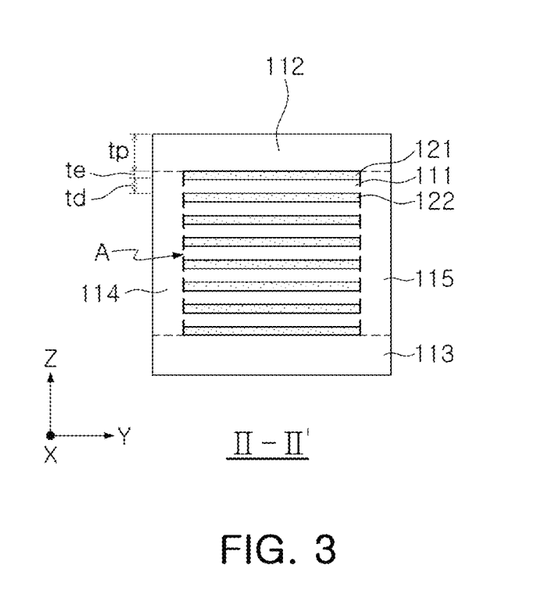
FIG. 3 is a cross-sectional view taken along line II-II' of FIG. 1.

FIG. 3 is a cross-sectional view taken along line II-II' of FIG. 1.

Figure 4:
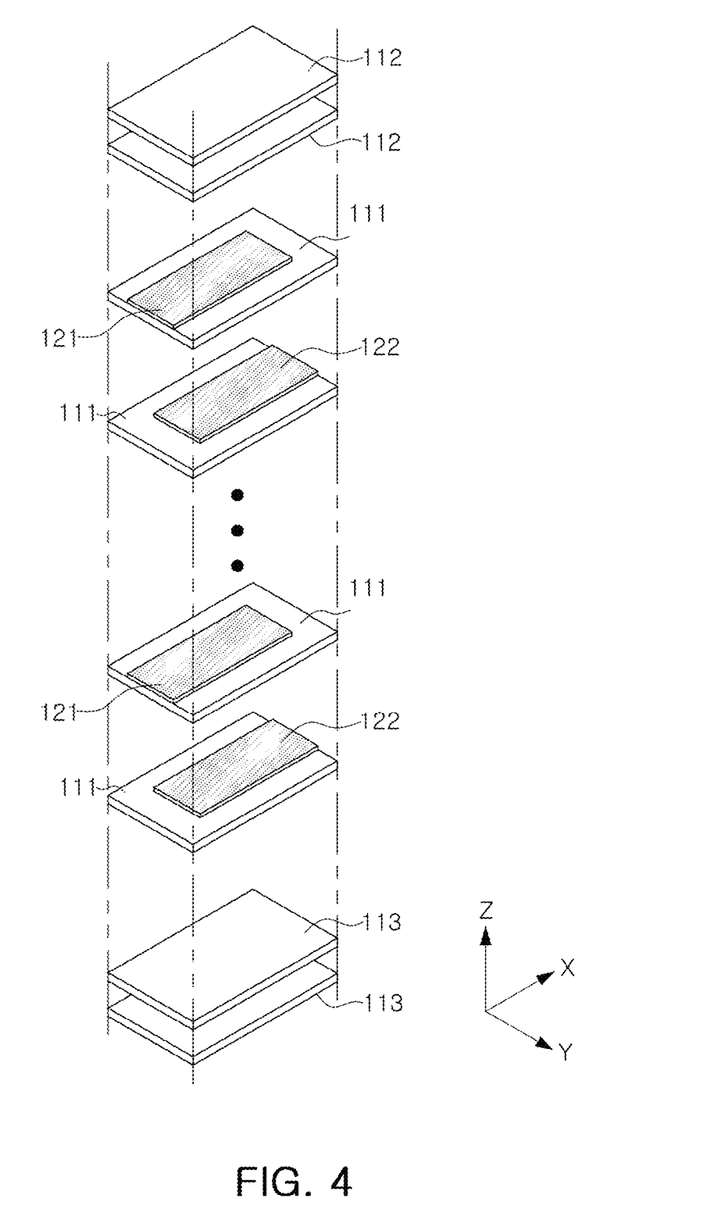
FIG. 4 is an exploded perspective view schematically illustrating a body in which a dielectric layer and an internal electrode are stacked according to an exemplary embodiment in the present disclosure.

FIG. 4 is an exploded perspective view schematically illustrating a body in which a dielectric layer and an internal electrode are stacked according to an exemplary embodiment in the present disclosure.

Hereinafter, a multilayer electronic component according to an exemplary embodiment in the present disclosure will be described in detail with reference to FIGS. 1 through 4.

A multilayer electronic component 100 may include: a body 110 including dielectric layers 111 and internal electrodes 121 and 122 alternately disposed with the dielectric layers 111; and external electrodes 131 and 132 disposed on the body 110 and connected to the internal electrodes 121 and 122. The internal electrodes include Ni, Ba, Ti, O, and Tb, and the content of Tb relative to the sum of the contents of Ni, Ba, Ti, O, and Tb is 0.45 to 3.0 wt %.

In the body 110, the dielectric layer 111 and the internal electrodes 121 and 122 are alternately stacked.

There is no particular limitation to a specific shape of the body 110 but, as shown, the body 110 may have a hexahedral shape or a shape similar thereto. Due to contraction (or shrinkage) of ceramic powder particles included in the body 110 during a firing process, the body 110 may have a substantially hexahedral shape, but may not have a hexahedral shape with perfectly straight lines.

The body 110 may have first and second surfaces 1 and 2 opposing each other in the thickness direction (Z direction), third and fourth surfaces 3 and 4 connected to the first and second surfaces 1 and 2 and opposing each other in the length direction (X direction), and fifth and sixth surfaces 5 and 6 connected to the first and second surfaces 1 and 2, connected to the third and fourth surfaces 3 and 4, and opposing each other in the width direction (Y direction).

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include $BaTiO_3$-based ceramic powder particles, and the ceramic powder particles may include $BaTiO_3$ and $(Ba_{1-x}Ca_x) TiO_3$, $Ba (Ti_{1-y}Ca_y) O_3$, $(Ba_{1-x}Ca_x) (Ti_{1-y}Zr_y) O_3$, or $Ba (Ti_{1-y}Zr_y) O_3$ obtained by partially dissolving calcium (Ca), zirconium (Zr), and the like in $BaTiO_3$.

As a material for forming the dielectric layer 111, various ceramic additives, organic solvents, plasticizers, binders, dispersants, etc. may be added to the powder particles such as barium titanate ($BaTiO_3$) according to purposes of the present disclosure.

Meanwhile, a thickness td of the dielectric layer 111 may not be limited.

However, in general, if the dielectric layer is formed to be thin to have a thickness less than 0.6 μm, in particular, if the thickness of the dielectric layer is 0.41 μm or less, reliability may be degraded.

As described below, according to an exemplary embodiment in the present disclosure, even when the dielectric layer and the internal electrode are very thin, reliability may be improved by effectively delaying initial sintering of the internal electrodes, and thus, sufficient reliability may be ensured even when the thickness of the dielectric layer is 0.41 μm or less.

Therefore, when the thickness of the dielectric layer 111 is 0.41 μm or less, the effect of improving reliability according to the present disclosure may be more remarkable.

The thickness td of the dielectric layer 111 may refer to an average thickness of the dielectric layer 111 disposed between the first and second internal electrodes 121 and 122.

The average thickness of the dielectric layer 111 may be measured by scanning an image of a length-thickness (L-T) directional cross-section of the body 110 with a scanning electron microscope (SEM).

For example, regarding a certain dielectric layer extracted from an image of the length-thickness (L-T) cross-section taken in a central portion of the body 110 in the width direction with the SEM, thicknesses thereof may be measured at 30 points at equal intervals in the length direction, and an average value thereof may be calculated.

The thicknesses measured at 30 equally spaced points may be measured at a capacitance forming portion A which refers to a region in which the first and second internal electrodes 121 and 122 overlap each other.

The body 110 may include the capacitance forming portion A formed inside the body 110 and forming capacitance with the first internal electrode 121 and the second internal electrode 122 disposed to face each other with the dielectric layer 111 interposed therebetween and cover portions 112 and 113 formed above and below the capacitance forming portion A.

In addition, the capacitance forming portion A is a part that contributes to formation of capacitance of the capacitor, which may be formed by repeatedly stacking a plurality of first and second internal electrodes 121 and 122 with the dielectric layer 111 interposed therebetween.

The upper cover portion 112 and the lower cover portion 113 may be formed by stacking a single dielectric layer or two or more dielectric layers on upper and lower surfaces of the capacitance forming portion A in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, a thickness of the cover portions 112 and 113 may not be limited. However, a thickness tp of the cover portions 112 and 113 may be 20 μm or less in order to more easily achieve miniaturization and high capacitance in the multilayer electronic component.

In addition, margin portions 114 and 115 may be disposed on side surfaces of the capacitance forming portion A.

The margin portions 114 and 115 may include a margin portion 114 disposed on the sixth surface 6 of the body 110 and a margin portion 115 disposed on the fifth surface 5 of the body 110. That is, the margin portions 114 and 115 may be disposed on both side surfaces of the ceramic body 110 in the width direction.

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste to a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the capacitance forming portion A in the width direction.

The internal electrodes 121 and 122 are alternately stacked with the dielectric layer 111.

The internal electrodes 121 and 122 may include first and second internal electrodes 121 and 122. The first and second internal electrodes 121 and 122 may be alternately disposed to face each other with a dielectric layer 111 configuring the body 110 interposed therebetween and may be exposed to the third and fourth surfaces 3 and 4 of the body 110, respectively.

Referring to FIG. 2, the first internal electrode 121 may be spaced apart from the fourth surface 4 and exposed to the third surface 3, and the second internal electrode 122 may be spaced apart from the third surface 3 and exposed to the fourth surface 4.

In this case, the first and second internal electrodes 121 and 122 may be electrically separated from each other by the dielectric layer 111 disposed therebetween.

Referring to FIG. 4, the body 110 may be formed by alternately stacking a ceramic green sheet on which the first internal electrode 121 is printed and a ceramic green sheet on which the second internal electrode 122 is printed and subsequently firing the green sheets.

The internal electrodes 121 and 122 of the present disclosure include Ni, Ba, Ti, O, and terbium (Tb), and the content of Tb relative to the sum of the contents of Ni, Ba, Ti, O and Tb may be 0.45 to 3.0 wt %. Accordingly, initial sintering of the internal electrodes may be reduced to reduce sintering mismatch between the internal electrodes and the dielectric layers, thereby improving connectivity of the internal electrodes and reducing a thickness deviation of the internal electrodes.

In addition, during sintering, Tb of the internal electrode may squeeze out to the dielectric layer and may be selectively substituted with an A-site or B-site of $BaTiO_3$ in the dielectric layer to suppress oxygen vacancies, thereby improving reliability.

In general, rare earth elements are known to stabilize temperature dependence (TCC) of a relative dielectric constant, lower a dissipation factor (DF), and increase a lifetime of a product, when added to dielectrics. In addition, it is known that the electrical properties of dielectrics vary depending on the type and content of rare earth elements.

Addition of rare earth ions having a medium ion radius to $BaTiO_3$ (BT) enables both side substitutions (A site and B site). If an appropriate time for thermal energy and migration of elements is given, the rare earth ions may selectively enter A site or B site to balance an acceptor and a donor, thereby improving electrical characteristics and reliability of the capacitor.

Rare earth elements have an ion radius smaller than $Ba^{2+}$, so they are easy to be substituted on the A site. Compared to other rare-earth elements which are 3+ ions, terbium has both 3+ and 4+ qualities, so that even when terbium is substituted to a B site ($Ti^{4+}$), there is no shortage of electrons, which is more advantageous for balancing the acceptor and the donor.

In the present disclosure, unlike the related art, by including Tb in the internal electrode, initial sintering of the internal electrodes is delayed to reduce sintering mismatch between the internal electrodes and the dielectric layer, thereby improving connectivity of the internal electrodes and reducing a thickness deviation of the internal electrodes. In addition, during firing, Tb of the internal electrode squeezes out to be selectively substituted to A-site or B-site of BaTiO3 of the dielectric layer to suppress oxygen vacancy.

If the content of Tb included in the internal electrodes after completion of sintering is less than 0.45 wt % of the sum of the contents of Ni, Ba, Ti, O and Tb, the effect of delaying initial sintering of the internal electrodes is insufficient, leading to a possibility that internal electrode connectivity is lowered and a thickness deviation of the internal electrodes increases.

Meanwhile, if the content of Tb included in the internal electrode exceeds 3.0 wt % of to the sum of the contents of Ni, Ba, Ti, O and Tb, the internal electrode connectivity is rather low and the thickness deviation of the internal electrode may increase.

According to an exemplary embodiment in the present disclosure, the internal electrodes 121 and 122 may have internal electrode connectivity of 85% or more.

Internal electrode connectivity may be defined as a ratio of a length of a portion where the internal electrode is actually formed to a total length of the internal electrode.

Figure 5:
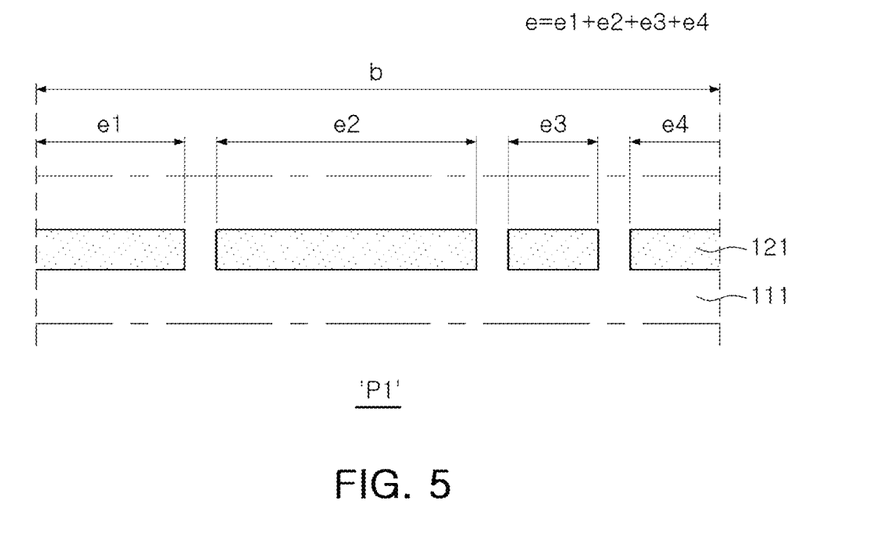
FIG. 5 is an enlarged view of region P1 of FIG. 2.

For example, as shown in FIG. 5, if the total electrode length measured at any one point of the internal electrode 121 is defined as b and the lengths of portions where the electrode is actually formed are defined as e1, e2, e3, and e4, internal electrode connectivity may be expressed as e/b, a value obtained by dividing the sum (e=e1+e2+e3+e4) of the lengths of the portions where the electrode is actually formed by the total electrode length b.

If internal electrode connectivity is less than 85%, it may be difficult to secure sufficient capacitance.

Initial sintering of the internal electrode to which a certain ratio of Tb is added according to an exemplary embodiment in the present disclosure is delayed and thus sintering mismatch between the internal electrode and the dielectric layer may be reduced, so that connectivity of the internal electrodes may be secured to 85% or more.

It is not necessary to specifically limit an upper limit of internal electrode connectivity, but the upper limit may be 97% considering a manufacturing process or the like.

In addition, the internal electrodes 121 and 122 may have a thickness deviation of 18% or less.

In the internal electrode to which Tb is added according to an exemplary embodiment in the present disclosure, since initial sintering is delayed, sintering mismatch between the internal electrode and the dielectric layer may be reduced, thereby securing a thickness deviation of 18% or less.

Here, the thickness deviation may refer to a CV value of the thickness of the internal electrode. That is, when an average value of the thicknesses of the internal electrodes is x1 and a standard deviation of the thicknesses of the internal electrodes is s1, a thickness deviation may be s1/x1*100(%).

In an exemplary embodiment, the dielectric layer 111 may include Tb. Since Tb of the internal electrodes 121 and 122 is squeezed out to the dielectric layer 111 during firing, the dielectric layer 111 may include Tb even when a composition for the dielectric layer does not contain Tb.

The internal electrodes 121 and 122 may be formed using a conductive paste for internal electrodes containing a Tb oxide and Ni, and a weight ratio of the Tb oxide to Ni may be 1.5 to 10.0 wt %. Accordingly, after the internal electrodes are sintered, the internal electrodes 121 and 122 may have a content of Tb of 0.45 to 3.0 wt % relative to the sum of the contents of Ni, Ba, Ti, O, and Tb.

In this case, the Tb oxide may be at least one of $Tb_4O_7$ and $Tb_2O_3$.

However, the Tb oxide may be $Tb_4O_7$ in order to more effectively improve internal electrode connectivity and reduce the thickness variation of the internal electrode with the same content.

Meanwhile, the thickness te of the internal electrodes 121 and 122 may not be particularly limited.

However, in general, if the internal electrodes 121 and 122 are formed to be thin to have a thickness less than 0.6

μm, in particular, if the thickness of the internal electrodes 121 and 122 is 0.41 μm or less, reliability may be lowered.

As described above, according to an exemplary embodiment in the present disclosure, even when the dielectric layer and the internal electrode are very thin, reliability may be improved by effectively delaying initial sintering, and thus, sufficient reliability may be ensured even when the thickness of the internal electrodes 121 and 122 is 0.41 μm or less.

Therefore, when the thickness of the internal electrodes 121 and 122 is 0.41 μm or less, the effect of improving reliability according to the present disclosure may be more remarkable and miniaturization and high capacitance of the capacitor component may be more easily achieved.

The thickness te of the internal electrodes 121 and 122 may refer to an average thickness of the internal electrodes 121 and 122.

The average thickness of the internal electrodes 121 and 122 may be measured by scanning an image of a length and thickness directional (L-T) cross-section of the body 110 with an SEM.

For example, in an image obtained by scanning a cross-section of the body 110 in the length and thickness directions (L-T) taken in a central portion of the body 110 in the width direction (W), certain first and second internal electrodes 121 and 122 may be extracted, and thicknesses thereof at 30 points at equal intervals in the length direction may be measured, and an average value of the measured thicknesses may be calculated.

The external electrodes 131 and 132 may be disposed on the body 110 and connected to the internal electrodes 121 and 122.

As shown in FIG. 2, the external electrodes 131 and 132 may be disposed on the third and fourth surfaces 3 and 4 of the body 110 and connected to the first and second internal electrodes 121 and 122, respectively.

In this exemplary embodiment, a structure in which the multilayer electronic component 100 has two external electrodes 131 and 132 is described, but the number or shape of the external electrodes 131 and 132 may be modified according to shapes of the internal electrodes 121 and 122 or other purposes.

Meanwhile, the external electrodes 131 and 132 may be formed of any material as long as the material has electrical conductivity such as a metal, and a specific material may be determined in consideration of electrical characteristics and structural stability, and further, the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a.

For a more specific example of the electrode layers 131a and 132a, the electrode layers 131a and 132a may be sintered electrodes including a conductive metal and glass or resin-based electrodes including a conductive metal and a resin.

In addition, the electrode layers 131a and 132a may have a form in which a firing electrode and a resin-based electrode are sequentially formed on the body. In addition, the electrode layers 131a and 132a may be formed by transferring a sheet including a conductive metal onto the body or by transferring a sheet including a conductive metal onto the firing electrode.

A material having excellent electrical conductivity may be used as the conductive metal included in the electrode layers 131a and 132a, and the material is not particularly limited. For example, the conductive metal may be one or more of nickel (Ni), copper (Cu), and alloys thereof.

The plating layers 131b and 132b serve to improve mounting characteristics. The plating layers 131b and 132b are not limited in type and may be plating layers including at least one of Ni, Sn, Pd, and alloys thereof or may be formed of a plurality of layers.

For a more specific example of the plating layers 131b and 132b, the plating layers 131b and 132b may include a Ni plating layer or an Sn plating layer, and in this case, the Ni plating layer and the Sn plating layer may be sequentially formed on the electrode layers 131a and 132a or the Sn plating layer, the Ni plating layer, and the Sn plating layer may be sequentially formed on the electrode layers 131a and 132a. In addition, the plating layers 131b and 132b may include a plurality of Ni plating layers and/or a plurality of Sn plating layers.

A size of the multilayer electronic component 100 may not be particularly limited.

However, in order to achieve both miniaturization and high capacitance, the number of layers needs to be increased by reducing the thickness of the dielectric layer and the internal electrode, and thus, the effect of improving reliability and insulation resistance according to the present exemplary embodiment may be remarkable in a multilayer electronic component having a 0402 size (length×width, 0.4 mm×0.2 mm) or less.

Accordingly, when the length of the multilayer electronic component is 0.44 mm or less and the width thereof is 0.22 mm or less, taking into account a manufacturing error and the size of external electrode, the reliability improvement effect according to the present disclosure may be more remarkable.

Hereinafter, a method of manufacturing a multilayer electronic component 100 according to an exemplary embodiment in the present disclosure will be described.

First, a plurality of ceramic green sheets are prepared.

The ceramic green sheet is for forming the dielectric layer 111 of the body 110, and a slurry may be prepared by mixing ceramic powder particles, a polymer, and a solvent, and the slurry may be formed in a sheet shape having a predetermined thickness through a method such as a doctor blade method, or the like.

Thereafter, a conductive paste for internal electrodes is printed with a predetermined thickness on at least one surface of each ceramic green sheet to form an internal electrode.

The conductive paste for internal electrodes may include a Tb oxide and Ni, and a weight ratio of the Tb oxide to Ni may be 1.5 to 10.0 wt %. Accordingly, after the internal electrodes are sintered, the internal electrodes 121 and 122 may have a content of Tb of 0.45 to 3.0 wt % relative to the sum of the contents of Ni, Ba, Ti, 0, and Tb.

In this case, the Tb oxide may be at least one of $Tb_4O_7$ and $Tb_2O_3$.

However, the Tb oxide may be $Tb_4O_7$ in order to more effectively improve internal electrode connectivity and reduce a thickness variation of the internal electrode with the same content.

As a printing method of the conductive paste for internal electrodes, a screen-printing method or a gravure printing method may be used.

Referring to FIG. 4, the ceramic green sheet on which the first internal electrode 121 is printed and the ceramic green sheet on which the second internal electrode 122 is printed are alternately stacked and pressed in a stacking direction to compress the plurality of stacked ceramic green sheets and the internal electrodes formed on the ceramic green sheets to form a stack.

In addition, at least one ceramic green sheet may be stacked above and below the stack to form cover portions 112 and 113.

The cover portions 112 and 113 may have the same composition as the dielectric layer 111 located inside the stack and differ from the dielectric layer 111 in that the cover portions 112 and 113 do not include internal electrodes.

Thereafter, each region of the stack corresponding to one capacitor is cut into a chip, and the chip is fired at high temperature to complete the body 110.

Thereafter, exposed portions of the first and second internal electrodes exposed to both sides of the body 110 may be covered to form first and second external electrodes 131 and 132 such that the first and second external electrodes 131 and 132 are electrically connected to the first and second internal electrodes.

direction (X direction) of the sintered sample chip. For three internal electrodes in the vicinity of ½ of the manufactured flake sample in the T direction (Z direction), five inner regions 5 nm apart from a dielectric interface in each of the internal electrodes in the T direction (Z direction) were measured. The measurement was performed using scanning transmission electron microscopy (STEM) equipment, and the contents of Ni, Ba, Ti, O, and Tb were quantitatively analyzed using energy-dispersive spectroscopy (EDS) for component analysis.

The wt % of Tb out of the total amount (100 wt %) of the five elements was expressed as the Tb content after firing.

TABLE 1

| Test No. | $Tb_4O_7$ wt %/Ni | Capacitance | Initial failure | MTTF (hr) | Electrode connectivity | Electrode thickness deviation | Content of Tb after firing (wt %) |
|---|---|---|---|---|---|---|---|
| 1* | 0.0 | 1.0 | 1.0 | 29 | 77% | 21% | 0.00 |
| 2* | 1.0 | 1.0 | 0.9 | 36 | 78% | 20% | 0.36 |
| 3 | 1.5 | 1.1 | 0.9 | 50 | 86% | 14% | 0.45 |
| 4 | 3.0 | 1.1 | 0.7 | 52 | 89% | 14% | 0.90 |
| 5 | 5.0 | 1.2 | 0.5 | 55 | 91% | 13% | 1.60 |
| 6 | 7.0 | 1.2 | 0.5 | 57 | 91% | 13% | 2.24 |
| 7 | 9.0 | 1.2 | 0.3 | 58 | 93% | 13% | 3.06 |
| 8 | 10.0 | 1.2 | 0.5 | 53 | 90% | 14% | 3.00 |
| 9* | 11.0 | 1.1 | 1.0 | 46 | 81% | 22% | 3.52 |
| 10* | 12.0 | 1.0 | 1.1 | 44 | 80% | 22% | 4.08 |

At this time, surfaces of the first and second external electrodes 131 and 132 may be plated with nickel or tin, if necessary.

EXAMPLE

Sample chips including internal electrodes formed using a conductive paste for internal electrodes in which a certain ratio of a Tb oxide was added to Ni were prepared, and based on Test No. 1 in which Tb was not added, relative values of capacitance and an initial failure were measured and a mean time to failure (MTTF), internal electrode connectivity, thickness deviation, and Tb content of each sample chip were measured and described in Table 1 below.

As for high-temperature load reliability, high-temperature load test was carried out on 400 samples per test No. under the conditions of 125° C. and 8 V, and initial failure and MTTF were measured.

As for the initial failure, the number of samples whose insulation resistance became 10 KΩ or less until initial 12 hours was determined as the initial failure, and a relative value was described based on an initial failure number of Test No. 1 as 1.0.

As for MTTF, a time during which insulation resistance was less than 10 KΩ was determined as the failure time.

As for electrode connectivity, an image of a cross-section in length and thickness directions (L-T cross-section) taken in a central portion of the body in the width direction W was scanned by a scanning electron microscope (SEM), and lengths of portions where internal electrodes are formed were measured relative to a total length for all internal electrodes, electrode connectivity of each internal electrode was obtained, and an average value thereof was described.

An electrode thickness deviation was calculated as s1/x1*100(%) in which x1 is an average value of the internal electrode thickness and s1 is a standard deviation of the internal electrode thickness.

In the case of the Tb content after firing, a flaked sample was prepared using FIB equipment at a point of ½ in the L It can be seen that, in the case of Test Nos. 1, 2, 9, and 10 in which the Tb content contained in the internal electrode after firing is less than 0.45 wt % or greater than 3.0 wt %, electrode connectivity is low and the electrode thickness deviation is also large.

Meanwhile, it can be seen that, in the case of Test Nos. 3 to 8 in which the Tb content contained in the internal electrode after firing is 0.45 wt % to 3.0 wt %, electrode connectivity is high and electrode thickness deviation is also small.

In addition, it can be seen that Test Nos. 3 to 8 have better capacitance than Test Nos. 1, 2, 9 and 10, initial failure is also low, and MTTF is also long.

Figure 6:
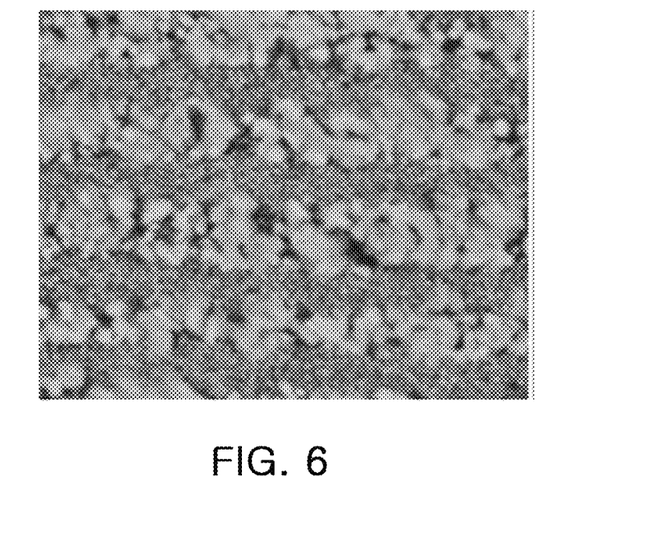
FIG. 6 is an image of a cross-section captured by a scanning electron microscope (SEM) during sintering of Test No. 1.
Figure 7:
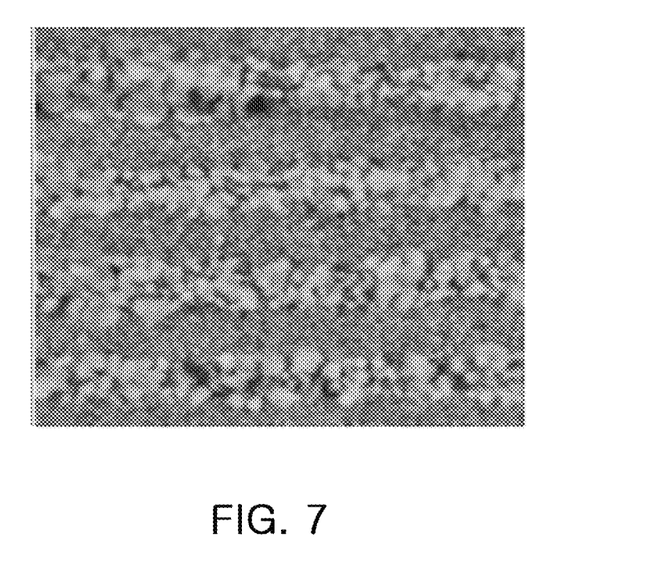
FIG. 7 is an image of a cross-section captured by a scanning electron microscope (SEM) during sintering of Test No. 7.

FIG. 6 is an image of a cross-section captured by a scanning electron microscope (SEM) during sintering of Test No. 1. FIG. 7 is an image of a cross-section captured by a scanning electron microscope (SEM) during sintering of Test No. 7.

A flake sample was prepared using FIB equipment at a point of ½ of a multilayer electronic component in the L direction (X direction) in a state in which sintering of the internal electrodes was in progress. When a central region in the T direction (Z direction) and W direction (Y direction) is observed with an SEM, comparing FIGS. 6 and 7, in the case of Test No. 7 to which Tb was added, it can be seen that Ni necking is delayed due to less sintering between Ni particles, compared to Test No. 1.

Sample chips including an internal electrode formed using a conductive paste for internal electrodes in which a certain ratio of $Tb_4O_7$, $Tb_2O_3$, $Dy_2O_3$, and $Yb_2O_3$ powder particles was added to Ni, relative values of capacitance and initial failure were measured based on Test No. 1 of Table 1 in which Tb was not added, and MTTF internal electrode connectivity, a thickness deviation, a Tb content of each sample chip were measured and described in Table 2.

TABLE 2

| Test No. | Internal electrode paste | | Capacitance | Initial failure | MTTF (hr) | Electrode connectivity | Electrode thickness deviation |
|---|---|---|---|---|---|---|---|
| | Added power wt %/Ni particle | particle | | | | | |
| 11 | 10.0 | $Tb_4O_7$ | 1.2 | 0.5 | 53 | 90% | 14% |
| 12 | | $Tb_2O_3$ | 1.1 | 0.8 | 50 | 88% | 18% |
| 13* | | $Dy_2O_3$ | 1.0 | 0.9 | 40 | 83% | 20% |
| 14* | | $Yb_2O_3$ | 1.0 | 0.9 | 41 | 83% | 20% |

It can be seen that Test Nos. 11 and 12 in which $Tb_4O_7$ or $Tb_2O_3$ was added have higher electrode connectivity and smaller electrode thickness deviations than Test Nos. 13 and 14 to which other rare earth elements were added.

In addition, it can be seen that Test Nos. 11 and 12 have better capacitance, lower initial failures, and longer MTTF than Test Nos. 13 and 14.

As set forth above, according to exemplary embodiments of the present disclosure, reliability of the multilayer electronic component may be improved.

One of various effects of the present disclosure is that, by adding Tb to the internal electrode, the initial sintering of the internal electrode is delayed, thereby reducing sintering mismatch between the internal electrode and the dielectric layer, improving the connectivity of the internal electrode, and reducing the thickness deviation of the internal electrode.

One of the various effects of the present disclosure is that, during firing, Tb of the internal electrode is squeezed out to the dielectric layer and is selectively substituted to the A-site or B-site of $BaTiO_3$ in the dielectric layer to suppress oxygen vacancy.

One of the various effects of the present disclosure is to improve capacitance of the multilayer electronic component.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including dielectric layers and internal electrodes alternately disposed with the dielectric layers; and
external electrodes disposed on the body and connected to the internal electrodes,
wherein one of the internal electrodes includes Tb, and a ratio of a length of an actual internal electrode to a total length of the one of the internal electrodes is defined as internal electrode connectivity, and the internal electrode connectivity of the one of the internal electrodes is 86% or more and 93% or less.

2. The multilayer electronic component of claim 1, wherein a thickness deviation of the one of the internal electrodes is 18% or less.

3. The multilayer electronic component of claim 2, wherein the thickness deviation of the one of the internal electrodes is greater than 0.

4. The multilayer electronic component of claim 1, wherein an average thickness of the one of the internal electrodes is 0.41 μm or less.

5. The multilayer electronic component of claim 1, wherein an average thickness of the one of the dielectric layers is 0.41 μm or less.

6. The multilayer electronic component of claim 1, wherein the multilayer electronic component has a length of 0.44 mm or less and a width of 0.22 mm or less.

* * * * *